US012656494B2

(12) United States Patent
Chouly

(10) Patent No.: US 12,656,494 B2
(45) Date of Patent: Jun. 16, 2026

(54) ESTIMATION OF A DISTANCE IN TIME-OF-FLIGHT MEASUREMENT DEVICE, AND CORRESPONDING DEVICE

(71) Applicant: STMicroelectronics France, Montrouge (FR)

(72) Inventor: Antoine Chouly, Paris (FR)

(73) Assignee: STMICROELECTRONICS FRANCE, Montrouge (FR)

( * ) Notice: Subject to any disclaimer, the term of this patent is extended or adjusted under 35 U.S.C. 154(b) by 1126 days.

(21) Appl. No.: 17/651,723

(22) Filed: Feb. 18, 2022

(65) Prior Publication Data

US 2022/0308224 A1 Sep. 29, 2022

(30) Foreign Application Priority Data

Mar. 29, 2021 (FR) ...................................... 2103213

(51) Int. Cl.
| | |
|---|---|
| *G01S 17/89* | (2020.01) |
| *G01B 11/22* | (2006.01) |
| *G01S 7/481* | (2006.01) |
| *G01S 7/4911* | (2020.01) |
| *G01S 7/4915* | (2020.01) |
| *H04B 10/071* | (2013.01) |

(52) U.S. Cl.
CPC .............. *G01S 17/89* (2013.01); *G01B 11/22* (2013.01); *G01S 7/4815* (2013.01); *G01S 7/4911* (2013.01); *G01S 7/4915* (2013.01); *H04B 10/071* (2013.01)

(58) Field of Classification Search
CPC ..... G01B 11/22; G01S 7/491; G01S 7/48–51; G01S 7/481; G01S 7/497
See application file for complete search history.

(56) References Cited

U.S. PATENT DOCUMENTS

| | | | |
|---|---|---|---|
| 2017/0038459 A1 | 2/2017 | Kubacki et al. | |
| 2019/0285750 A1* | 9/2019 | Mellot .................. | H10F 30/225 |
| 2020/0064453 A1* | 2/2020 | Vaello Paños .......... | G01S 17/08 |
| 2021/0405158 A1* | 12/2021 | Hegde ..................... | G01S 7/497 |

FOREIGN PATENT DOCUMENTS

WO 2020101576 A1 5/2020

* cited by examiner

*Primary Examiner* — Yuqing Xiao
*Assistant Examiner* — Chia-Ling Chen
(74) *Attorney, Agent, or Firm* — Slater Matsil, LLP

(57) ABSTRACT

A method for determining a distance offset between a depth map of an indirect time-of-flight measurement device and a reference ground truth map includes emitting emission optical radiation by an emission circuit of the indirect time-of-flight measurement device. The emission optical radiation is sequentially modulating by N modulation frequencies. N is greater than or equal to three. The method further includes receiving, by a reception circuit of the indirect time-of-flight measurement device, reception optical radiation generated by the emission optical radiation reflected off objects of a scene and by optical crosstalk between the emission optical radiation and the reception optical radiation, and estimating the distance offset based on the reception optical radiation.

20 Claims, 6 Drawing Sheets

ESTIMATION OF A DISTANCE IN TIME-OF-FLIGHT MEASUREMENT DEVICE, AND CORRESPONDING DEVICE

CROSS-REFERENCE TO RELATED APPLICATIONS

This application claims priority to French Application No. 2103213, filed on Mar. 29, 2021, which application is hereby incorporated herein by reference in its entirety.

TECHNICAL FIELD

Implementations and embodiments generally relate to optical detection systems, particularly optical detection systems based on the use of indirect time-of-flight measurement techniques.

BACKGROUND

A depth map is a digital representation of the distance between the positions of different objects of a scene and a receiver, the rendering whereof is comparable to a photograph supporting depth and not brightness data.

Such a depth map can be obtained with an indirect time-of-flight measurement.

In recent years, an increasing number of applications such as facial recognition, virtual reality, and active motor vehicle safety increasingly require compact and low-cost high-performance imaging systems.

In this regard, imaging systems based on the use of indirect time-of-flight measurement techniques referred to by a person skilled in the art using the acronym "iToF" ("indirect Time of Flight") and benefiting from a highly integrated structure and accurate and fast performance, meet these expectations particularly well.

As a general rule, a so-called "iToF" optical detection system supplies, in a detection field, periodic modulated optical light radiation derived, for example, from vertical-cavity surface-emitting laser diodes, commonly referred to by a person skilled in the art using the acronym "VCSEL", and measures, indirectly, the distance separating an object located in the detection field and the iToF system via a phase-shift measurement of the optical signal received after reflection off the object with respect to the optical light radiation emitted.

To increase the maximum measurement distance, sequentially modulated optical radiation with several modulation frequencies can be used.

In iToF systems, the delay between the signal transmitted and the signal received results in a shift on the measured phase of the signal. This results in a offset of the estimated depth map with respect to the so-called reference "ground truth" map. This offset (also known as zero distance) corresponds to the distance measured for a target zero distance.

This distance offset is generally performed in the factory with a static calibration.

However, the distance offset can vary over time, for example due to temperature variations of the iToF system.

There is hence a need to account for these potential variations of the distance offset.

SUMMARY

According to an implementation and embodiment, a dynamic estimation of the distance offset is performed by a multi-frequency iToF device using crosstalk between the multi-frequency radiation emitted by the device and the radiation reflected on the objects of a scene.

Thus, according to an aspect, the an embodiment of the invention relates to a method for determining a distance offset between a depth map generated by an iToF measurement device and a reference ground truth map.

The method according to this aspect comprises generation of the depth map and an estimation of the distance offset based on reception by the device of reception optical radiation, which is obtained by reflected radiation and by crosstalk between an emission radiation of the device and this reflected radiation.

The emission optical radiation is sequentially modulated by N modulation frequencies, N being greater than or equal to 3, for example equal to 3.

The reflected radiation is, for its part, obtained from the reflection off objects of a scene of the emission optical radiation emitted by the device.

In practice, the sequentially modulated optical radiation may be emitted from an emission zone of the device (e.g. a region including a circuit such as an optoelectronic circuit configured to emit optical radiation) whereas the reception optical radiation may be received in a reception zone of the device (e.g. a region including a circuit such as an optoelectronic circuit configured to receive optical radiation).

And, according to an implementation, crosstalk is advantageously generated by a glass pane covering the emission circuit and the reception circuit. Indeed, crosstalk then results from signal reflections in this glass pane.

Each image of the depth map is obtained from N demodulations of the reception optical radiation with the N respective modulation frequencies.

In other words, each image of the depth map is obtained from a group of N demodulations of the reception optical radiation.

Also, according to an implementation, the generation of the depth map comprises successive groups of N demodulations of the reception optical radiation with the N respective modulation frequencies, so as to acquire in response to each group of demodulations, for each pixel of a set of pixels of the reception circuit, components of the demodulated optical radiation associated with the N frequencies.

The set of pixels can comprise all the pixels of the reception circuit or a subset of these pixels, for example pixels uniformly distributed in the reception circuit.

The estimation of the distance offset comprises a dynamic estimation of the distance offset group by group.

This dynamic estimation includes, after a current group of demodulations, an estimation of a current output distance offset based on the current components of the demodulated optical radiation obtained by the current group of demodulations and based on a current input distance offset obtained from a preceding output distance offset, estimated in response to the preceding group of demodulations, the first input distance offset being an initial distance offset.

This initial distance offset can be, for example, the static distance offset determined in the factory or indeed a distance offset estimated during a preceding dynamic estimation.

So as to reduce the jitter on the estimated distance offset and improve the tracking of temporal variations of this distance offset, a recursive filtering of the preceding output distance offset is advantageously further provided. Additionally, the current input distance offset is the filtered preceding output distance offset.

According to an implementation, the estimation of the current output distance offset comprises a preparation of a current set of reference distance values located on either side of the current input distance offset value.

This set of reference distance values actually corresponds to a value range, for example centered around the current input distance offset value.

For each pixel of the set of pixels, and for each reference distance value of the current set, an estimation is performed of at least three crosstalk values based on current components of the demodulated optical radiation, assigned to the pixel and respectively associated with at least three pairs of modulation frequencies taken from the N modulation frequencies.

A selection is performed of the reference distance value minimizing, with a single local minimum, an error between the estimated crosstalk values.

The current output offset is then determined based on the selected reference values.

In practice, the reference distance values of the set may be, advantageously, integer values, for example expressed in millimeters.

The determination of the current output offset comprises, for example, the preparation of a current histogram on the set of pixels, this histogram including, for each selected reference distance value, (i.e. the minimizing error with a single local minimum) the number of pixels having resulted in this selected reference distance value.

Where the number of reference values in the set, (i.e. the length of the range) is not too great, there is generally only one reference value minimizing the error between the estimated crosstalk values with a single local minimum.

That being said, where the number of reference values of the set (i.e. the length of the range) is great, it is possible that for one or more pixels, the error between the estimated crosstalk values is minimized with several local minima, for example two local minima.

In this case, and according to an implementation, a pixel for which the error between the estimated crosstalk values is minimized with several local minima is not taken into account in the current histogram.

The method may advantageously comprise an analysis of the current histogram using a sliding analysis window, a selection of the window counting the greatest number of pixels and a determination of the current output distance offset in this window, for example by a weighted mean.

According to a further aspect, an embodiment of the invention relates to an iToF measurement device, comprising an emission circuit configured to emit emission optical radiation sequentially modulated by N modulation frequencies N being greater than or equal to three and intended to be reflected on objects of a scene so as to generate reflected radiation, a crosstalk region configured to generate optical crosstalk between the emission radiation and the reflected radiation, a reception circuit configured to receive reception optical radiation from the reflected radiation and the crosstalk, and a processing circuit configured to generate a depth map and estimate a distance offset between the depth map and a reference ground truth map, based on the reception optical radiation.

According to an embodiment, the crosstalk region includes a glass pane covering the emission circuit and the reception circuit.

According to an embodiment, the processing circuit is configured to perform successive groups of N demodulations of the reception optical radiation with the N respective modulation frequencies, so as to acquire in response to each group of demodulations, for each pixel of a set of pixels of the reception circuit, components of the demodulated optical radiation associated with the N frequencies, and to perform a dynamic estimation of the distance offset group by group, the dynamic estimation including after a current group of demodulations, an estimation of a current output distance offset based on the current components of the demodulated optical radiation obtained by the current group of demodulations and based on a current input distance offset taken from a preceding output distance offset, estimated in response to the preceding group of demodulations, the first input distance offset being an initial distance offset.

According to an embodiment, the processing circuit includes a filtering circuit configured to perform recursive filtering of the preceding output distance offset, the current input distance offset being the filtered preceding output distance offset.

According to an embodiment, to perform the estimation of the current output distance offset, the processing circuit is configured to prepare a current set of reference distance values located on either side of the current input distance offset value, and for each pixel of the set of pixels, and for each reference distance value of the set, to perform an estimation of at least three crosstalk values based on the components of the demodulated optical radiation, assigned to the pixel and respectively associated with at least three pairs of modulation frequencies taken from the N modulation frequencies, select the reference distance value minimizing with a single local minimum, an error between the estimated crosstalk values, and determine the current output offset based on the selected reference values.

According to an embodiment, the reference distance values are integer values and for the selection of the reference distance value minimizing the error with a single local minimum, the processing circuit is configured to prepare a current histogram on the set of pixels including each selected reference distance value, the number of pixels having resulted in this selected reference distance value.

According to an embodiment, the processing circuit is configured to exclude in the current histogram, each pixel for which the error between the estimated crosstalk values is minimized with more than one local minima.

According to an embodiment, the processing circuit is configured to perform an analysis of the current histogram using a sliding analysis window, to select the window counting the greatest number of pixels and to determine the current output distance offset in this window.

According to a further aspect, an embodiment of the invention relates to a communication device, for example a "smartphone" type cellular mobile phone, a phablet, or a digital tablet.

BRIEF DESCRIPTION OF THE DRAWINGS

Further advantages and features of the invention will emerge upon studying the detailed description of embodiments and implementations, and of the appended drawings schematically illustrating embodiments of the invention, wherein.

DETAILED DESCRIPTION OF ILLUSTRATIVE EMBODIMENTS

Figure 1:
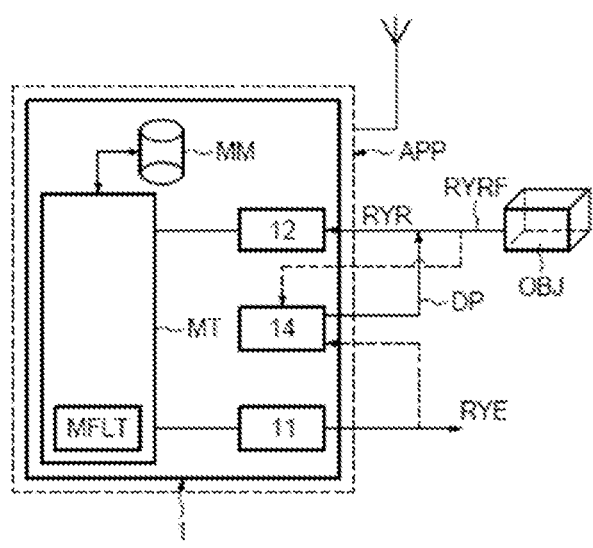
FIG. 1 illustrates an example iToF device.

FIG. 1 illustrates an indirect time-of-flight measurement device (iToF device) 1, for example incorporated into a communication device APP such as a smartphone type cellular mobile phone, a phablet, a digital tablet, and the like, without these examples of devices being limiting.

The iToF device 1 comprises an emission circuit 11 including, for example, an array of vertical-cavity surface emitting laser (VCSEL) diodes.

This emission circuit 11 is configured to emit emission optical radiation RYE sequentially modulated by N modulation frequencies. In this example, N is equal to 3.

By way of non-limiting example, a first modulation frequency f1 can be equal to 200 MHz, a second modulation frequency f2 can be equal to 177.77 MHz, and a third modulation frequency f3 can be equal to 133.33 MHz.

The emission optical radiation RYE is intended to be reflected on objects OBJ of a scene so as to generate a reflected radiation RYRF.

The iToF device 1 also includes crosstalk region 14, returned to in detail hereinafter in a structure example, configured to generate optical crosstalk DP between the emission radiation RYE and the reflected radiation RYRF.

The iToF device 1 also includes a reception circuit 12 including here a pixel array.

This reception circuit 12 is configured to receive a reception optical radiation RYR which is obtained from the reflected radiation RYRF and the crosstalk DP.

The iToF device 1 also includes a processing circuit MT configured to generate a depth map and estimate a distance offset between the depth map and a reference ground truth map based on the reception optical radiation RYR.

The processing circuit MT may be of conventional structure and include, for example, a modulator/demodulator and a computing circuit. The processing circuit MT can be embodied in a software and/or hardware manner using, for example, a microcontroller and/or hardware components.

Moreover, as will be seen in more detail hereinafter, the processing circuit MT may advantageously include a filtering circuit MFLT, for example of recursive type.

A memory circuit MM is also provided to, for example, temporarily store certain data such as demodulated signal components.

Figure 2:
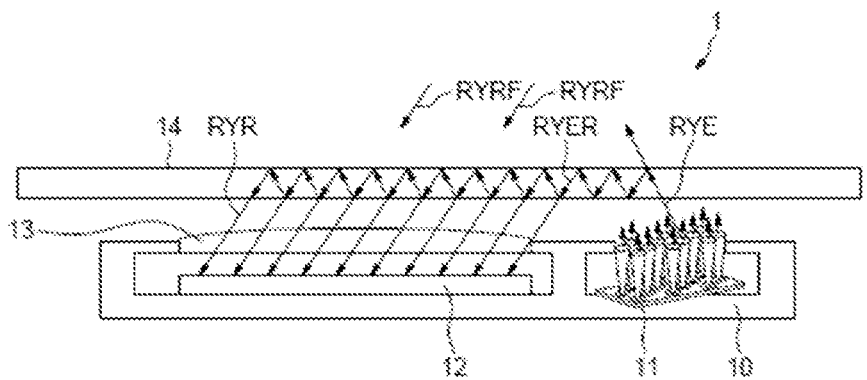
FIG. 2 illustrates another example iToF device.

FIG. 2 illustrates more precisely but still schematically, an example of iToF device 1.

It is seen here that the emission circuit 11 and the reception circuit 12 are located in a substrate 10.

The reception circuit 12 is covered with a lens 13. Moreover, the iToF device 1 includes a glass pane 14 (e.g. for protection) covering the emission circuit 11 and the reception circuit 12.

The glass pane 14 forms here the crosstalk region referred to in FIG. 1.

Indeed, this crosstalk is here generated by the signal reflections on and inside the glass pane 14. Thus, a portion of the emission radiation RYE is reflected in the glass pane 14 in a secondary radiation RYER, which will be combined with the reflected radiation RYRF from objects of the scene.

It is also possible that a portion of the reflected radiation RYRF is also reflected within the glass pane 14. That being said, this reflection phenomenon of the reflected signal is secondary with respect to the reflection of the emission radiation RYE as the intensity of the emission radiation RYE is markedly greater than the intensity of the reflected radiation RYRF.

Under noise-free conditions and assuming a sinusoidal modulation, the demodulated complex signal $S_i$ at the frequency $f_i$, delivered by the reception circuit 12 is given by the following formula (I).

$$S_i = I_i + jQ_i = (A\exp(j\varphi_i) + X)\exp(j\varphi_{off,i}) \tag{I}$$

In formula (I), $I_i$ is the in-phase component of the signal and $Q_i$ is the quadrature component (i.e. phase-shifted by 90 degrees) of the signal.

The term A denotes the amplitude of the signal and X the amplitude of the crosstalk.

Moreover, the phase $\varphi_i$ of the signal (without crosstalk) is given by formula (II).

$$\varphi_i = 4\pi d_t f_i/c \tag{II}$$

The phase shift $\varphi_{off,i}$ at the frequency $f_i$ is given by formula (III).

$$\varphi_{off,i} = 4\pi d_o f_i/c \tag{III}$$

In formulas (I), (II) and (III), j denotes the complex number in which the square is equal to −1, $d_t$ is the target distance and do is the distance offset ("zero distance") between the depth map and the reference map, and c is the speed of light.

Figure 3:
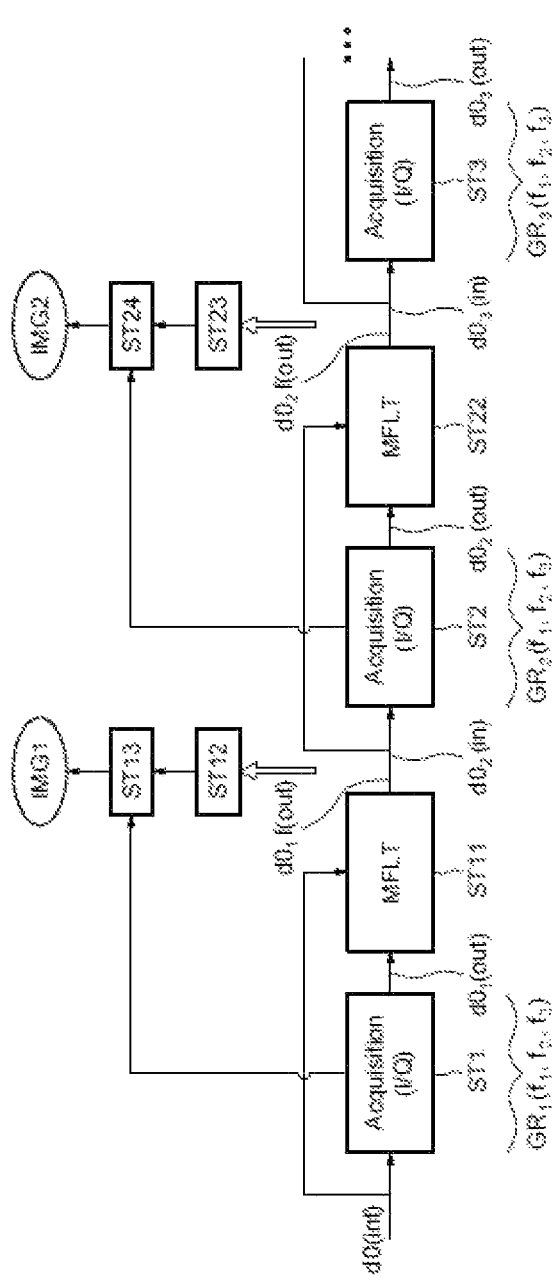
FIG. 3 illustrates an example method of generating a depth map.

Reference is now made more specifically to FIG. 3 and the following to describe an implementation of the method according to an embodiment of the invention.

As illustrated very schematically in FIG. 3, the generation of the depth map comprises successive groups $GR_i$ of N (here 3) demodulations of the reception optical radiation with the three respective modulation frequencies $f_1$, $f_2$, $f_3$.

Each group of three demodulations make it possible to generate an image of the depth map and also make it possible, as will be seen, to estimate the distance offset (zero distance) dynamically, demodulation group by demodulation group, based on the preceding estimated value of this distance offset.

Although it is possible to account for all the pixels of the reception circuit, it is also possible to account for only a smaller set of pixels of this reception circuit, for example pixels uniformly distributed in the reception circuit.

And each group of three demodulations makes it possible to acquire, for each pixel of the set of pixels, components I and Q of the demodulated optical radiation associated with the three modulation frequencies.

Thus, as illustrated in FIG. 3, the acquisition ST1 of the components I and Q of the pixels of the set in question and resulting from the first GR1 of demodulation at the frequencies $f_1$, $f_2$ and $f_3$ makes it possible, using the input distance offset do(init) which is here an initial distance offset, for example a static distance offset, to obtain a first output distance offset $do_1$(out).

Then, in this example, this distance offset do1(out) is filtered in a step ST11 by the recursive filtering circuit MFLT so as to supply a first filtered output distance offset do1$f$(out) which will be used as a second input distance offset $do_2$(in) for the following processing operation.

This first filtered output distance offset $do_1f$(out) is compensated in a step ST12 by a conventional compensation block, for example software, for the generation ST13 of the first image IMG1 of the depth map.

The second processing operation is similar to the first processing operation described above.

More specifically, the second group $GR_2$ of three demodulations at the frequencies $f_1$, $f_2$ and $f_3$ makes it possible to determine for each of the pixels of the set in question, the components I and Q of the demodulated reception optical radiation.

The second output distance offset $do_2(out)$ is then estimated in the step ST2 based on these components I and Q and the input distance offset $do_2(in)$ then filtered in the step ST22 by the recursive filtering circuit MFLT so as to supply the second filtered distance offset $do_2f(out)$ which will serve as a third input distance offset $do_3(in)$ to enable the estimation of the third output offset $do_3(out)$ based on the components I and Q obtained in the step ST3 in response to the third group $GR_3$ of three demodulations.

This second filtered output distance offset $do_2f(out)$ is also delivered to the compensation block to enable a compensation ST23 with a view to the generation ST24 of the second image IMG2 of the depth map.

Figure 4:
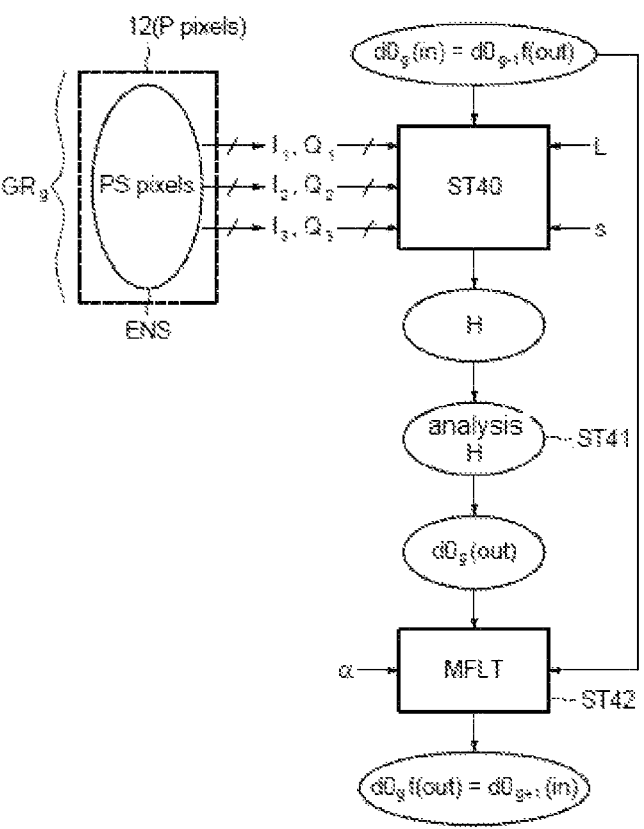
FIG. 4 illustrates an example method of estimating of the current output distance offset associated with the current group of demodulations of the reception optical radiation.

Reference is now made more specifically to FIG. 4 to describe an example of estimation of the current output distance offset $do_gf(out)$ associated with the current group $GR_g$ of three successive demodulations of the reception optical radiation at the frequencies $f_1$, $f_2$ and $f_3$.

More specifically, these three demodulations make it possible to acquire, for the PS pixels of the set ENS in question taken from the P pixels of the reception circuit 12, the components $I_1$, $Q_1$ of the demodulated signal at the frequency $f_1$, the components $I_2$, $Q_2$ of the demodulated signal at the frequency $f_2$ and the components $I_3$, $Q_3$ of the demodulated signal at the frequency $f_3$.

As will be detailed hereinafter with reference to FIG. 5, in the step ST40, based on all the components $I_1$, $Q_1$, $I_2$, $Q_2$, $I_3$, $Q_3$ of all PS pixels, the current input distance offset $do_g(in)$, equal to the filtered preceding output offset $do_{g-1}f$ (out), a length L and a step s, a histogram H is prepared which will be analyzed in the step ST41 to obtain the current output offset $do_g(out)$.

Then, this current output offset is filtered in the step ST42 by the recursive filtering circuit MFLT using the coefficient $\alpha$ less than 1, equal for example to 0.5.

The filtered current output offset $do_gf(out)$ which will be equal to the following input distance offset $do_{g+1}$ (in) is then obtained.

A recursive filtering method, which may be well-known to a person skilled in the art, is defined by formula (IV).

$$do_gf(out)=\alpha do_g(out)+(1-\alpha)do_g(in) \tag{IV}$$

Figure 5:
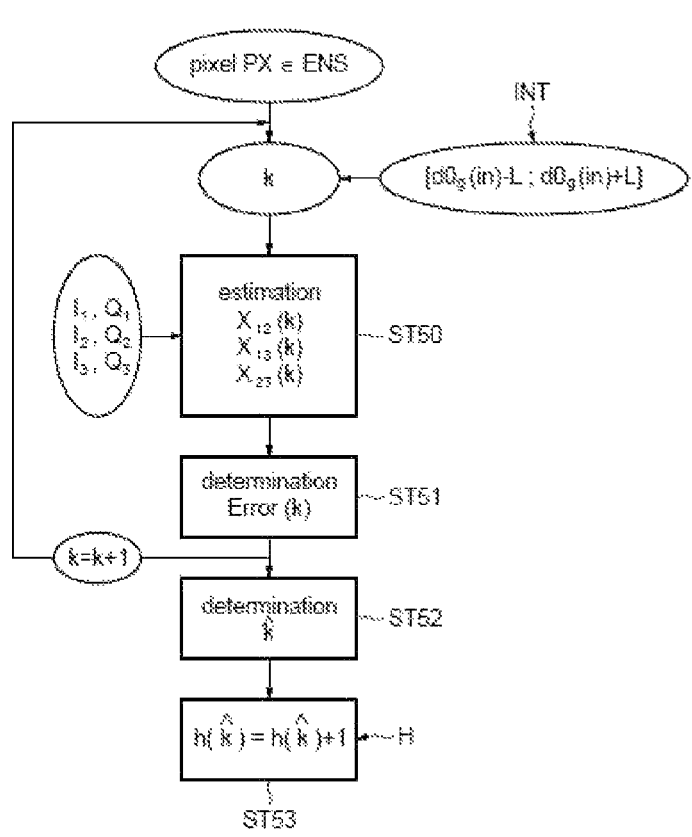
FIG. 5 illustrates an example method of preparing a histogram.

Reference is now made more specifically to FIG. 5 to describe in more detail the operations performed in the step ST40 of FIG. 4, for the current group $GR_g$ of demodulations, and for each pixel PX of the set ENS.

A range INT of integer values centered around the current input distance offset $do_g(in)$ and of length 2L is prepared.

More specifically, as illustrated in FIG. 5, this range INT is equal to $[do_g(in)-L; do_g(in)+L]$.

The integer values of this range INT define so-called reference distance values, located on either side of the value of current input distance offset $do_g(in)$.

L is the maximum offset of the zero distance with respect to the last estimated value of the distance offset, namely the value $do_g(in)$.

The integer values of this range is spaced by the step s.

By way of example, for a broad range, L can be selected as equal to 300 mm and s to 8 mm.

Such a broad range is used, for example, for determining the first output distance offset $do_1(out)$ corresponding to the first group $GR_1$ of demodulations making it possible to obtain the first image IMG1 of the depth map.

For the other images of the depth map (i.e., for the other groups of three demodulations) a narrower range can be used where L is equal, for example, to 12 mm and s is equal to 2 mm.

The processing circuit MT scans the range INT and for each value k of this range INT, the processing circuit determine for the pixel in question the three crosstalk values $X_{12}(k)$, $X_{13}(k)$ and $X_{23}(k)$ based on the current components $I_1$, $Q_1$, $I_2$, $Q_2$, $I_3$, $Q_3$ assigned to this pixel and respectively associated with the three pairs of modulation frequencies ($f_1$, $f_2$), ($f_1$, $f_3$), ($f_2$, $f_3$) (step ST50).

The crosstalk value $X_{ij}(k)$ for i,j=1,2, 1,3 and 2,3 is taken here equal to $0.5U/(V-W+10^{-8})$ where U, V and W are defined by formulas (V), (VI) and (VII) below, where the in-phase components $I_i$ and $I_j$ and quadrature components $Q_i$ and $Q_j$ at the frequency $f_i$ and at the frequency $f_j$ are expressed in MHz, and c is expressed in km/second.

$$U=(I_i^2+Q_i^2)-(I_j^2+Q_j^2) \tag{V}$$

$$V=I_i \cos(2\pi f_i k/c)+I_i \sin(2\pi f_i k/c) \tag{VI}$$

$$W=I_j \cos(2\pi f_j k/c)+I_j \sin(2\pi f_j k/c) \tag{VII}$$

It should be noted that the crosstalk value $X_{ij}(k)$ is equal in theory to $0.5U/(V-W)$. However, to avoid any division by zero should V=W, a very low-powered term, for example $10^{-8}$, may be added.

Then, the processing circuit determines, in the step ST51, the error (k) between the three crosstalk values.

This error (k) is defined by the formula (VIII) where ABS denotes the absolute value.

$$\text{Error}(k)=\text{ABS}(X_{12}(k)-X_{23}(k))+\text{ABS}(X_{12}(k)-X_{13}(k))+\text{ABS}(X_{13}(k)-X_{23}(k)) \tag{VIII}$$

The operations ST50 and ST51 are resumed for all the k values of the range INT.

When this is performed, in step ST52, the reference value $\hat{k}$ of the range INT minimizing said error is determined.

The current histogram H includes for each selected reference distance value $\hat{k}$ the number of pixels having resulted in this selected reference value.

When the processing is initialized, the histogram H is set to zero.

In the step ST53, the value of the histogram $h(\hat{k})$ is incremented by 1.

It is possible in certain cases, that there is more than one local minimum in the range INT.

In other words, it is possible that two reference values of the range $\hat{k}$ and $\hat{k}'$ minimize the error (k).

Figure 6:
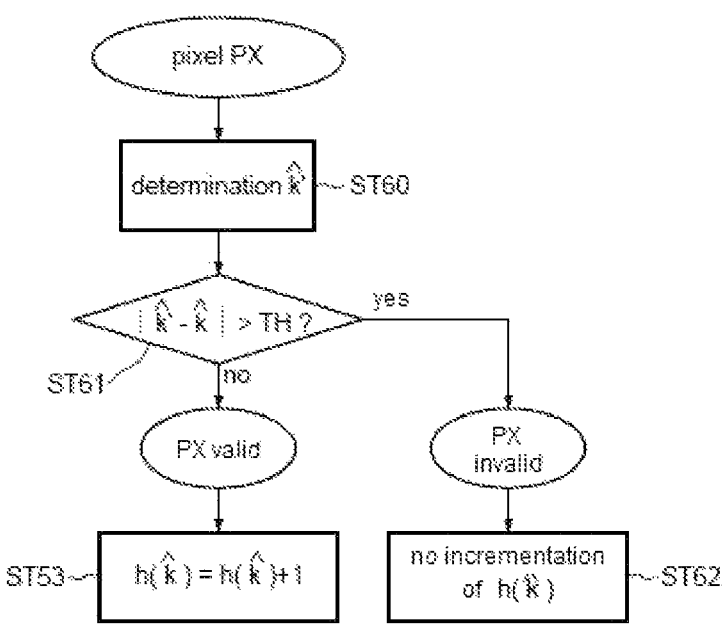
FIG. 6 illustrates an example method of determining validity of a pixel.

In this case, as illustrated in FIG. 6, after having determined in the step ST60 a second selected reference value $\hat{k}'$ minimizing the error, the processing circuit determines the absolute value of the difference between these two values $\hat{k}'$ and $\hat{k}$ and compare this absolute difference value to a threshold TH (step ST61).

If this difference is less than or equal to the threshold TH taken, for example, equal to 9 mm, this means that there is only one local minimum, the pixel PX is then considered as being valid and the incrementation of the step ST53 can be performed.

If however the absolute value of the difference, in the step ST61, is greater than the threshold TH, then the pixel PX is considered to be invalid as this means that there are two local minima for the error. Consequently, there is no incrementation of the value $h(\hat{k})$ of the histogram H (step ST62).

It should be noted that this determination of the validity or invalidity of a pixel is performed generally in wide ranges.

Figure 7:
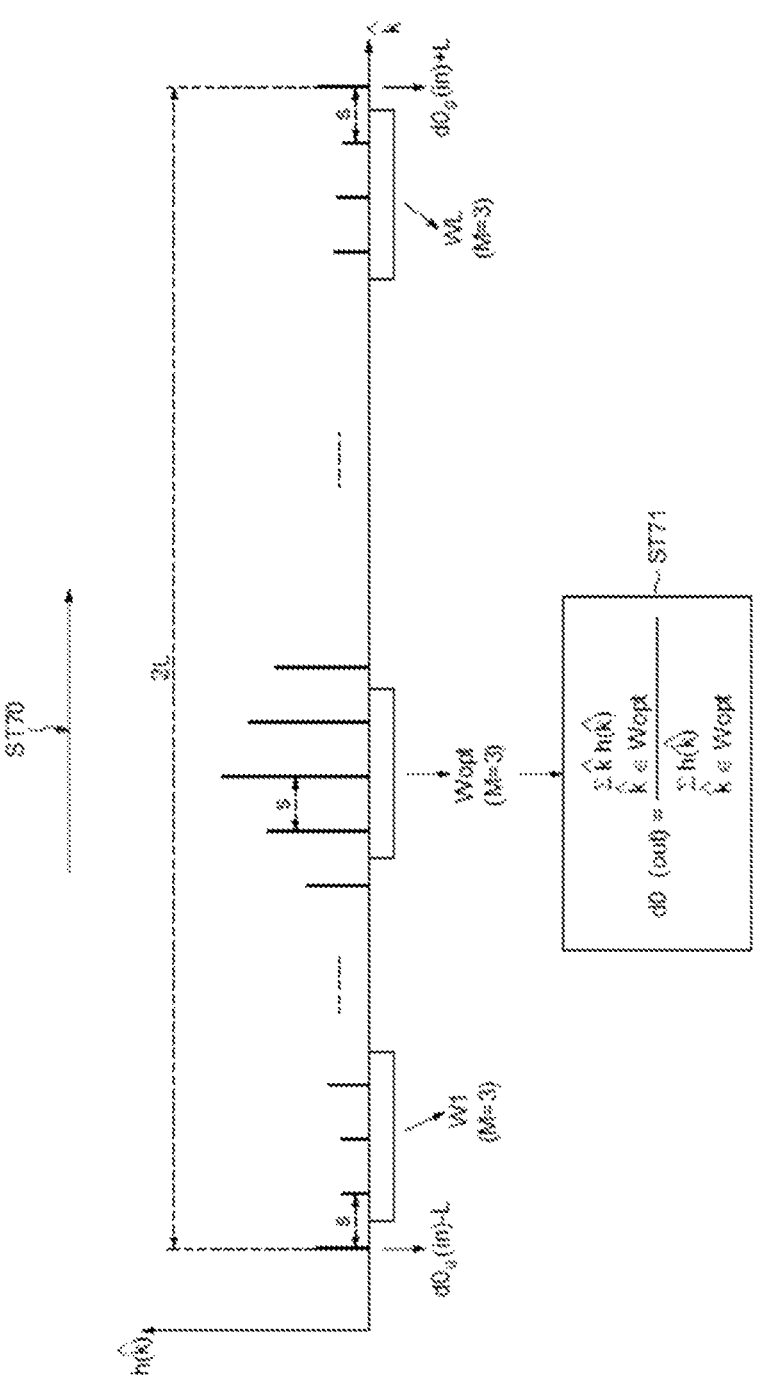
FIG. 7 illustrates an example method of analyzing the histogram.

Once the current histogram H has been obtained, the analysis ST70 thereof illustrated in FIG. 7 is performed.

More specifically, an analysis of the histogram was performed using a sliding analysis window W1 to WL between the two bounds $do_g(in)–L$ and $do_g(in)+L$ preferably excluding the limits of the range.

The size M of this sliding window is taken, for example, to be equal to 3.

The processing circuit MT then selects the window counting the greatest number of pixels.

In the example illustrated in FIG. 7 this is the window Wopt.

The current output distance offset $do_g(out)$ is then determined in this window using for example the weighted formula illustrated in step ST71.

What is claimed is:

1. A method for determining a distance offset between a depth map of an indirect time-of-flight measurement device and a reference ground truth map, the method comprising:
   emitting, by an emission circuit of the indirect time-of-flight measurement device, emission optical radiation, the emission optical radiation being sequentially modulated by N modulation frequencies, wherein N is greater than or equal to three;
   receiving, by a reception circuit of the indirect time-of-flight measurement device, reception optical radiation generated by the emission optical radiation reflected off objects of a scene and by optical crosstalk between the emission optical radiation and the reception optical radiation; and
   estimating the distance offset based on the reception optical radiation by using the optical crosstalk as a reference signal,
   wherein estimating the distance offset comprises dynamically estimating the distance offset group by group by estimating a current output distance offset after a current group of demodulations and in response to a preceding group of demodulations, the current output distance offset being based on current components of demodulated optical radiation obtained by the current group of demodulations, and on a current input distance offset taken from a preceding output distance offset, and
   wherein estimating the current output distance offset comprises:
      preparing a current set of reference distance values located on either side of a current input distance offset value;
      for each pixel of a set of pixels and for each reference distance value of the current set,
         estimating at least three crosstalk values based on the current components of the demodulated optical radiation, assigned to the pixel, and respectively associated with at least three pairs of modulation frequencies taken from the N modulation frequencies, and
         selecting a reference distance value that minimizes an error between the estimated crosstalk values; and
      determining the current output distance offset based on the selected reference distance value.

2. The method according to claim 1, wherein the optical crosstalk is generated by a glass pane covering the emission circuit and the reception circuit.

3. The method according to claim 1, further comprising:
   generating the depth map using successive groups of N demodulations of the reception optical radiation with the N respective modulation frequencies so as to acquire, in response to each group of demodulations and for each pixel of the set of pixels of the reception circuit, components of the demodulated optical radiation associated with the N modulation frequencies.

4. The method according to claim 1, wherein estimating the distance offset further comprises recursively filtering a preceding output distance offset, the current input distance offset being the filtered preceding output distance offset.

5. The method according to claim 1, wherein the reference distance values are integer values, and wherein determining the current output distance offset comprises preparing a current histogram for the set of pixels including, for each selected reference distance value, the number of pixels having resulted in the selected reference distance value.

6. The method according to claim 5, wherein preparing the current histogram comprises:
   including each pixel for which the error between the estimated crosstalk values is minimized with a single local minimum in the current histogram, and
   excluding each pixel for which the error between the estimated crosstalk values is minimized with more than one local minimum from the current histogram.

7. The method according to claim 5, further comprising analyzing the current histogram using a sliding analysis window by selecting a window including the greatest number of pixels, and determining the current output distance offset in the selected window.

8. An indirect time-of-flight measurement device comprising
   an emission circuit configured to emit emission optical radiation sequentially modulated by N modulation frequencies, N being greater than or equal to three;
   a crosstalk region configured to generate optical crosstalk between the emission optical radiation and reflected radiation generated by the emission optical radiation reflecting off objects of a scene;
   a reception circuit configured to receive reception optical radiation from the reflected radiation and the optical crosstalk; and
   a processing circuit configured to generate a depth map and estimate a distance offset between the depth map and a reference ground truth map based on the reception optical radiation by using the optical crosstalk as a reference signal,
   wherein the processing circuit is configured to generate the depth map using successive groups of N demodulations of the reception optical radiation with the N respective modulation frequencies, so as to acquire, in response to each group of demodulations and for each pixel of a set of pixels of the reception circuit, components of the demodulated optical radiation associated with the N modulation frequencies, and
   wherein to estimate a current output distance offset, the processing circuit is configured to:
      prepare a current set of reference distance values located on either side of a current input distance offset value;
      for each pixel of the set of pixels and for each reference distance value of the current set, estimate at least three crosstalk values based on the components of the demodulated optical radiation, assigned to the pixel and respectively associated with at least three pairs of modulation frequencies taken from the N modulation frequencies, and
select a reference distance value that minimizes an error between the estimated crosstalk values; and
determine the current output distance offset based on the selected reference distance value.

9. The indirect time-of-flight measurement device according to claim 8, wherein the crosstalk region comprises a glass pane covering the emission circuit and the reception circuit.

10. The indirect time-of-flight measurement device according to claim 8, wherein the processing circuit is configured to dynamically estimate the distance offset group by group by estimating the current output distance offset after a current group of demodulations and in response to a preceding group of demodulations, the current output distance offset being based on current components of the demodulated optical radiation obtained by the current group of demodulations, and on a current input distance offset taken from a preceding output distance offset.

11. The indirect time-of-flight measurement device according to claim 8, wherein the processing circuit comprises a filtering circuit configured to recursively filter a preceding output distance offset, the current input distance offset value being the filtered preceding output distance offset.

12. The indirect time-of-flight measurement device according to claim 8, wherein the reference distance values are integer values, and wherein, for the selection of the reference distance value minimizing the error, the processing circuit is configured to prepare a current histogram for the set of pixels including, for each selected reference distance value, the number of pixels having resulted in the selected reference distance value.

13. The indirect time-of-flight measurement device according to claim 12, wherein the processing circuit is further configured to:
include each pixel for which the error between the estimated crosstalk values is minimized with a single local minimum in the current histogram, and
exclude each pixel for which the error between the estimated crosstalk values is minimized with more than one local minimum from the current histogram.

14. The indirect time-of-flight measurement device according to claim 12, wherein the processing circuit is further configured to:
analyze the current histogram using a sliding analysis window by selecting a window including the greatest number of pixels, and
determine the current output distance offset in the selected window.

15. A communication device comprising:
an indirect time-of-flight measurement device comprising:
an emission circuit configured to emit emission optical radiation sequentially modulated by N modulation frequencies, N being greater than or equal to three;
a crosstalk region configured to generate optical crosstalk between the emission optical radiation and reflected radiation generated by the emission optical radiation reflecting off objects of a scene;
a reception circuit configured to receive reception optical radiation from the reflected radiation and the optical crosstalk; and a processing circuit configured to generate a depth map and estimate a distance offset between the depth map and a reference ground truth map based on the reception optical radiation by using the optical crosstalk as a reference signal,
wherein the processing circuit is configured to generate the depth map using successive groups of N demodulations of the reception optical radiation with the N respective modulation frequencies, so as to acquire, in response to each group of demodulations and for each pixel of a set of pixels of the reception circuit, components of the demodulated optical radiation associated with the N modulation frequencies, and
wherein to estimate a current output distance offset, the processing circuit is configured to:
prepare a current set of reference distance values located on either side of a current input distance offset value;
for each pixel of the set of pixels and for each reference distance value of the current set,
estimate at least three crosstalk values based on the components of the demodulated optical radiation, assigned to the pixel and respectively associated with at least three pairs of modulation frequencies taken from the N modulation frequencies, and
select a reference distance value minimizing error between the estimated crosstalk values; and
determine the current output distance offset based on the selected reference distance value.

16. The communication device according to claim 15, wherein the communication device is a cellular mobile phone, a phablet, or a digital tablet.

17. The communication device according to claim 15, wherein the optical crosstalk is generated by a glass pane covering the emission circuit and the reception circuit.

18. The communication device according to claim 15, wherein the processing circuit is configured to dynamically estimate the distance offset group by group by estimating the current output distance offset after a current group of demodulations and in response to a preceding group of demodulations, the current output distance offset being based on current components of the demodulated optical radiation obtained by the current group of demodulations, and on a current input distance offset taken from a preceding output distance offset.

19. The communication device according to claim 15, wherein the processing circuit comprises a filtering circuit configured to recursively filter a preceding output distance offset, the current input distance offset value being the filtered preceding output distance offset.

20. The communication device according to claim 15, wherein to estimate the current output distance offset value, the processing circuit is configured to:
prepare a current set of reference distance values located on either side of the current input distance offset value;
for each pixel of the set of pixels and for each reference distance value of the current set,
estimate at least three crosstalk values based on the components of the demodulated optical radiation, assigned to the pixel and respectively associated with at least three pairs of modulation frequencies taken from the N modulation frequencies, and
select a reference distance value minimizing error between the estimated crosstalk values; and determine the current output distance offset based on the selected reference distance value.

* * * * *